United States Patent
Hamanaka et al.

[11] Patent Number: 5,938,992
[45] Date of Patent: Aug. 17, 1999

[54] PRODUCTION METHOD OF THIN WALL CORDIERITE HONEYCOMB STRUCTURE

[75] Inventors: Toshiyuki Hamanaka, Suzuka; Wataru Kotani, Kasugai, both of Japan

[73] Assignee: NGK Insulators, Ltd., Japan

[21] Appl. No.: 09/140,403

[22] Filed: Aug. 26, 1998

[30] Foreign Application Priority Data

Aug. 29, 1997 [JP] Japan ................................. 9-249920

[51] Int. Cl.$^6$ .............................................. C04B 35/195
[52] U.S. Cl. .............................. 264/43; 264/44; 264/631; 264/177.12
[58] Field of Search .................................. 264/630, 631, 264/177.12, 43, 44

[56] References Cited

U.S. PATENT DOCUMENTS

| | | | |
|---|---|---|---|
| 4,295,892 | 10/1981 | Matsuhisa et al. | 501/120 |
| 5,258,150 | 11/1993 | Merkel et al. | 264/631 |
| 5,409,870 | 4/1995 | Locker et al. | 264/631 |

*Primary Examiner*—James Derrington
*Attorney, Agent, or Firm*—Parkhurst & Wendel, L.L.P.

[57] ABSTRACT

A production method of a honeycomb structure is provided. The production method of a thin wall cordierite honeycomb structure having cordierite as the main component of the crystalline phase includes: adding a forming auxiliary agent to a cordierite material to obtain a mixture, kneading the mixture to obtain a material batch, forming the material batch by extrusion to form a honycomb compact, drying the honeycomb compact to obtain a dried body, and firing the dried body. The cordierite material batch contains 65% by weight or more flat plate-like cordierite raw material including crystal water made from talc, kaolin and aluminum hydroxide with the BET specific surface areas for the cordierite raw materials being 7 to 18 $m^2/g$ of talc, 14 to 22 $m^2/g$ of kaolin and 6 to 18 $m^2/g$ of aluminum hydroxide. The method can realize a thinner wall and a higher cell density and can improve the formability (in particular, the lubricity and the shape stability) at the time of extruding, the mechanical strength (hydrostatic pressure fracture strength), and the catalyst carrying characteristics.

6 Claims, 4 Drawing Sheets

PRODUCTION METHOD OF THIN WALL CORDIERITE HONEYCOMB STRUCTURE

BACKGROUND OF THE INVENTION

1. Field of the Invention

The present invention relates to a method for producing an excellently strong thin wall cordierite ceramic honeycomb structure by extruding.

2. Description of Related Art

Cordierite ceramic honeycomb structures are used as an exhaust gas purifying catalyst carrier, a filter, or a heat exchanger for automobiles or the industrial use.

Recently, improvement of the thermal shock resistance and the strength have been desired particularly for a honeycomb catalyst carrier to be used in an exhaust gas apparatus for automobiles since it needs to be mounted in the vicinity of the engine in order to improve the catalyst performance by reducing the volume of the catalyst carrier, to improve the light off performance, to lower the pressure loss for improving the fuel consumption performance and improving the output, to improve the strength for reducing the cost for canning into the casing, and to improve the catalyst activity.

Therefore, a thinner wall for a rib of a honeycomb structure for improving the catalyst performance and a thinner wall for a rib of a honeycomb structure while maintaining the cell density for achieving a higher cell density and a lower pressure loss have been conventionally discussed. However, since materials (in particular, magnesia material) needs to have fine particles due to the strength decline for the thinner wall in the porous cordierite honeycomb structure and reduction of the die slit width at the time of extruding, a problem is involved in that a drastic rise in the thermal expansion ratio can be generated.

Furthermore, it is difficult to have cordierite ceramics denser. In particular, since the amount of impurities to be a fusing agent such as calcia, alkaline, and sodium carbonate needs to be extremely small with a low expansion cordierite material showing a $2.0 \times 10^{-6}/°C$. or less at a room temperature to 800° C. coefficient of thermal expansion, the glass phase becomes extremely small so as to form a porous substance.

In particular, since a cordierite honeycomb structure recently used as an automobile exhaust gas purifying catalyst carrier requires a $1.5 \times 10^{-6}/°C$. or less coefficient of thermal expansion from a room temperature to 800° C., the porosity can be 20 to 45% at best even if refined talc, kaolin, alumina materials with little impurities. In particular, in a honeycomb structure having a 30% or less porosity, increase of the impurity amount and finer material particles are necessary so that one having a $1.0 \times 10^{-6}/°C$. or less coefficient of thermal expansion from a room temperature to 800° C. have not been obtained.

Furthermore, since a cordierite honeycomb structure having a comparatively low porosity contracts drastically in the drying and firing processes, a crack can be easily generated and thus it is difficult to obtain a large honeycomb structure with a good yield.

In order to solve the problems, Japanese Patent Publication (Kokoku) No. 4-70053 discloses a method of improving the strength of ceramic itself by having the porosity of cordierite ceramics denser to 30% or less.

In the method, the ceramic itself becomes denser and stronger by having a 30% or less porosity of the cordierite ceramics in order to prevent decline of the isostatic strength, which is the compression load from the outer wall and outer periphery direction of the honeycomb structure by the honeycomb cell deformation generated at the time of extruding.

However, in the above-mentioned method, since the porosity of the cordierite ceramics is 30% or les, the improvement of the catalyst carrying characteristics of the cordierite honeycomb structure cannot be expected, and further, the effect of having a thinner wall and a higher cell density in the cordierite honeycomb structure was not sufficient.

SUMMARY OF THE INVENTION

Accordingly, in order to cope with the above-mentioned conventional problems, an object of the present invention is to provide a production method of a cordierite honeycomb structure, capable of achieving a thinner wall and a higher cell density in the cordierite honeycomb structure and improving the formability (in particular, the lubricity and the shape stability) at the time of extruding, the mechanical strength (hydrostatic pressure fracture strength), and the catalyst carrying characteristics.

According to the present invention, there is provided a production method of a thin wall cordierite honeycomb structure having cordierite as the main component of the crystalline phase, which comprises: adding a forming auxiliary agent to a cordierite material to obtain a mixture, kneading the mixture to obtain a material batch, forming the material batch by extrusion to form a honycomb compact, drying the honeycomb compact to obtain a dried body, and firing the dried body, wherein 65% by weight or more flat plate-like cordierite raw material including crystal water made from talc, kaolin and aluminum hydroxide is contained in the cordierite material batch, with the BET specific surface areas for the cordierite raw materials being 7 to 18 $m^2/g$ of talc, 14 to 22 $m^2/g$ of kaolin and 6 to 18 $m^2/g$ of aluminum hydroxide.

In the present invention, it is preferable that the average wall thickness of the obtained honeycomb structure is 110 $\mu$m or less, the coefficient of thermal expansion in the direction of flow passages of the cordierite honeycomb structure obtained in the present invention at 40 to 800° C. is $0.8 \times 10^{-6}/°C$. or less, the porosity is 24 to 38%, and the isostatic strength is 10 $kg/cm^2$ or more.

It is further preferable that the BET specific surface areas for the cordierite raw materials being 10 to 18 $m^2/g$ of talc, 16 to 20 $m^2/g$ of kaolin and 10 to 18 $m^2/g$ of aluminum hydroxide.

DESCRIPTION OF THE PREFERRED EMBODIMENTS

Figure 1:
FIG. 1 is an SEM photograph showing the particle structure of talc A.

In a production method of a cordierite honeycomb structure according to the present invention, 65% by weight or more flat plate-like cordierite raw materials including crystal water made from talc, kaolin and aluminum hydroxide is contained in a cordierite material batch.

Accordingly, the lubricity of the clay mixture to be extruded and the shape stability after extruding can be improved even with a low extrusion pressure at the time of extruding.

As mentioned above, in the production method of a cordierite honeycomb structure of the present invention, it is important to use the three kinds of raw materials, that is, talc, kaolin and aluminum oxide as the cordierite raw materials at the same time, and to have the cordierie raw materials with a flat and plate-like shape in order to reinforce the interaction in the particle surface, in particular, the surface energy of the flat surface.

Further, the amount of the cordierite raw materials in the cordierite material batch is preferably 65% by weight or more, more preferably 70% by weight or more in order to prevent the extrusion pressure rise at the time of extruding and to improve the shape stability after extruding.

Moreover, since a large amount of calcined talc, calcined kaolin, and alumina leads to drastic deterioration of the clay mixture lubricity, it is preferable to have the minimum amount.

However, although the cordierite raw materials are preferable for extruding of a thin wall honeycomb structure without cell deformation, they can generate a firing crack of a cordierite ceramic honeycomb structure.

Therefore, in a production method of a cordierite honeycomb structure of the present invention, the BET specific surface areas of the cordierite raw materials are defined, that is, 7 to 18 $m^2/g$, preferably 10 to 18 $m^2/g$ of talc, 14 to 22 $m^2/g$, preferably 16 to 22 $m^2/g$ of kaolin and 6 to 18 $m^2/g$, preferably 10 to 18 $m^2/g$ of aluminum hydroxide.

With the BET specific surface areas of the cordierite raw materials having less than 7 $m^2/g$ of talc, less than 14 $m^2/g$ of kaolin and less than 6 $m^2/g$ of aluminum hydroxide, the lubricity at the time of extruding is poor and the interaction among the material particles is small so that the shape stability after extruding is poor to generate cell deformation, and thus a sufficient isostatic strength (10 $kg/cm^2$ or more) cannot be obtained.

In general, since the aspect ratio of material particles with a small BET specific surface area is small even when they are fine particles and it is poor in terms of the flatness, the lubricity is poor and the honeycomb network forming ability is also poor.

On the other hand, with the BET specific surface areas of the cordierite raw materials having more than 18 $m^2/g$ of talc, more than 22 $m^2/g$ of kaolin and more than 18 $m^2/g$ of aluminum hydroxide, since the firing contraction becomes large, it is difficult to prevent crack generation in the firing process.

Further, it is preferable that the talc used as a cordierite raw material of the present invention is a micro talc with a small crystal (single crystal).

The kaolin is preferably delamination kaolin, which has a laminate layer peeled off to be a thinner layer in the artificial or natural condition, but can be tube-like kaolin to become plate-like at the time of extruding, such as halloysite.

It is more preferable that the aluminum hydroxide has a high BET specific surface area applied with a pulverizing treatment to be a thin layer after crystal precipitation by the Bayer process.

The BET specific surface area herein denotes the surface area per a unit mass of a solid obtained by the gas adsorption theory of Brunauer, Emett and Teller (BET isotherm), which is a method for determining the surface area by calculating the area of multimolecular layer.

It is further preferable that the coefficient of thermal expansion at 40 to 800° C. in a cordierite honeycomb structure obtained in the present invention is $0.8 \times 10^{-6}/°C$. or less in the direction of flow passages.

With a more than $0.8 \times 10^{-6}/°C$. coefficient of thermal expansion [CTE] (the direction of flow passages of the honeycomb sintered body), the thermal shock resistance [Esp] becomes lower than 700° C. for a cylindrical honeycomb structure having about 100 mm diameter so that it cannot be used for an automobile exhaust gas catalyst carrier.

The production method of a cordierite honeycomb structure of the present invention will be explained in further detail.

The cordierite material batch of a cordierite honeycomb structure is prepared with 65% by weight or more of cordierite raw materials including talc, kaolin, and aluminum hydroxide and the remainder including calcined kaolin, alumina, silica, calcined talc, and the like such that the chemical composition of the main components can be 42 to 56% by weight of $SiO_2$, 30 to 45% by weight of $Al_2O_3$, and 12 to 16% by weight of MgO. A honeycomb compact is formed by adding an organic binder such as water and methyl cellulose and a plasticizer to the cordierite material batch, mixing, kneading and extruding. A cordierite honeycomb structure can be obtained by drying the honeycomb compact and firing at 1350 to 1440° C.

At the time, it is preferable that the temperature rise rate in the crystal water dehydrating temperature region of the aluminum hydroxide and the kaolin is restrained by 50° C./Hr in order to prevent crack generation in the cordierite honeycomb structure. It is also effective to conduct a debinder treatment before firing.

As heretofore mentioned, a production method of a cordierite honeycomb structure of the present inveniton has been achieved by finding a cordierite raw material having a high BET specific surface area having both excellent lubricity at the time of extruding and shape stability with respect to deformation by self-weight after extruding. In producing a thin wall honeycomb structure having a 40 to 110 μm wall thickness, the cell deformation after forming and the coefficient of thermal expansion after firing can be extremely small, the isostatic strength with a 24 to 38% porosity can be 10 $kg/cm^2$ or more, and the catalyst carrying characteristics can be improved when the porosity is 30% or more.

The present invention will be explained in further detail with reference to examples, but the present invention is not limited thereto.

The performance of the cordierite materials, the honeycomb compacts and the honeycomb sintered bodies obtained in the examples were evaluated by the method mentioned below.

(Measuring method for the particle size)

The particle size was measured with Sedigraph (X-ray sedimentation method) produced by Micromeritech Corp.

(Measuring method for the BET specific surface area)

The BET specific surface area was measured with Flowsorb II2300 produced by Micromeritech Corp (He[30%]/$N_2$ [70%] gas was used as the adsorption gas).

(Mearusing method for the chemical analysis value)

The chemical analysis value was measured by the fluorescent X-ray spectroscopy.

(Measuring method for the porosity)

The porosity was calculated from the entire pore volume in the mercury penetration method (the cordierite true specific gravity herein was 2.52).

(Measuring method for the themal shock resistance).

Whether or not a honeycomb structure (honeycomb sintered body) of a room temperature placed in an electric furnace, maintained for 30 minutes, and taken out to the room temperature has a fracture was meacured by the hammering judgment (with 50° C. interval from 600° C., the safe temperature [°C] is shown).

(Measuring method for the isostatic strength)

With a honeycomb structure (honeycomb sintered body) inserted in a flexible tube, the pressure (kg/cm$^2$) at which partial breakage was generated by applying a uniform hydraulic pressure was measured (average value of 10 specimens). The isostatic strength can be the criterion for evaluating the endurance, such as the property of holding the honeycomb catalyst to a metal casing and vibration in the actual run.

(Examples 1 to 17, Comparative Examples 1 to 7)

As the cordierite material, clay mixture for extruding was prepared with materials having the particle size, the BET specific surface area, and the chemical analysis value shown in Table 1 according to the proportional ratio shown in Tables 2 and 3 by adding 4% by weight of methyl cellulose and water with respect to 100% by weight of the material and kneading. The material herein was used after passing through a 44 μm sieve.

Figure 2:
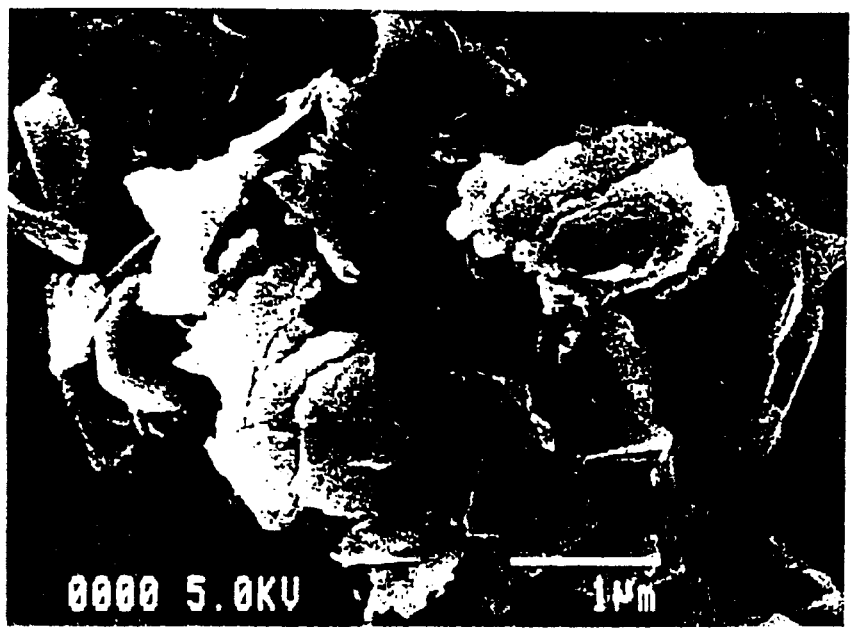
FIG. 2 is an SEM photograph shwoing the particle structure of talc B.
Figure 3:
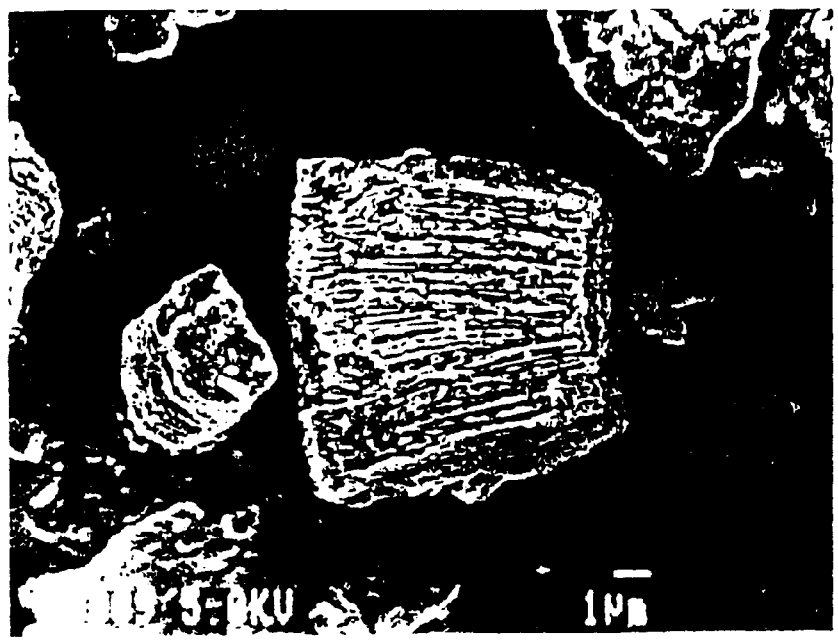
FIG. 3 is an SEM photograph showing the particle structure of kaolin A.
Figure 4:
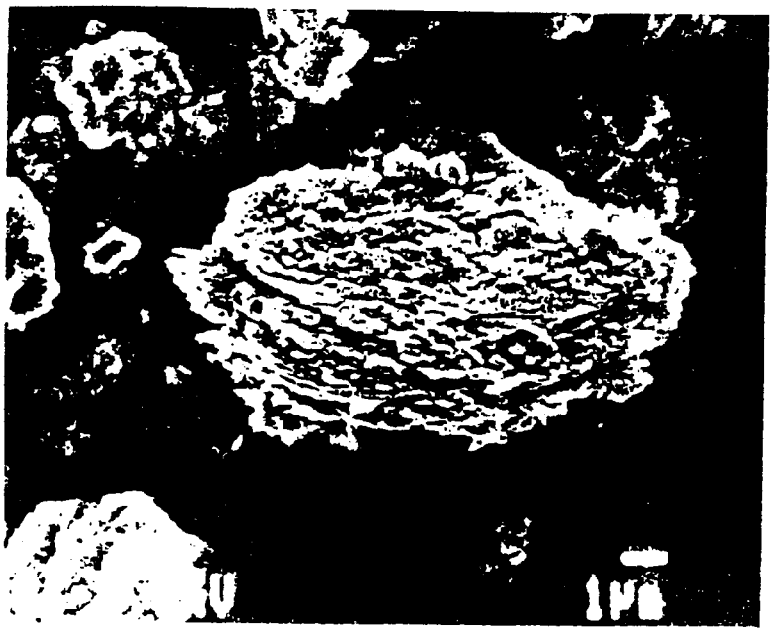
FIG. 4 is an SEM photograph showing the particle structure of kaolin B.
Figure 5:
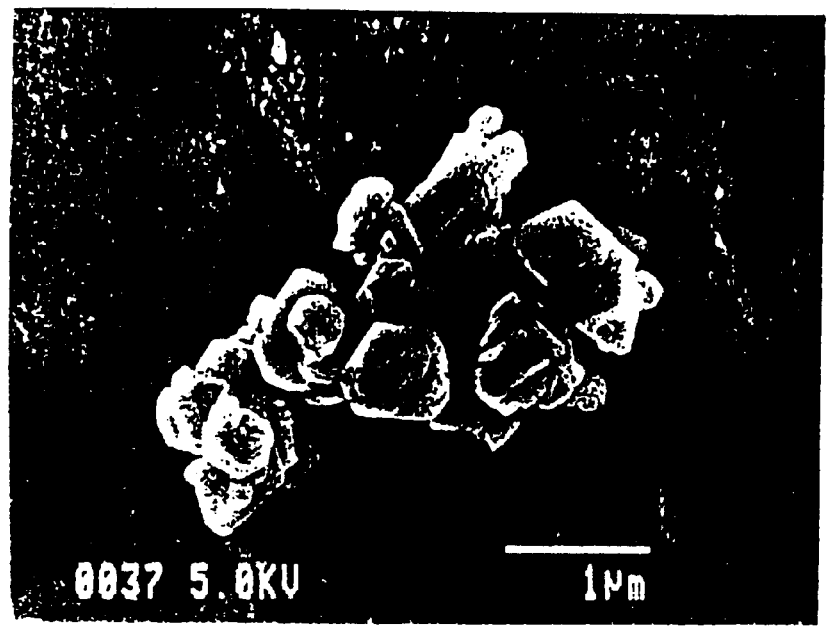
FIG. 5 is an SEM photograph showing the particle structure of aluminum hydroxide A.
Figure 6:
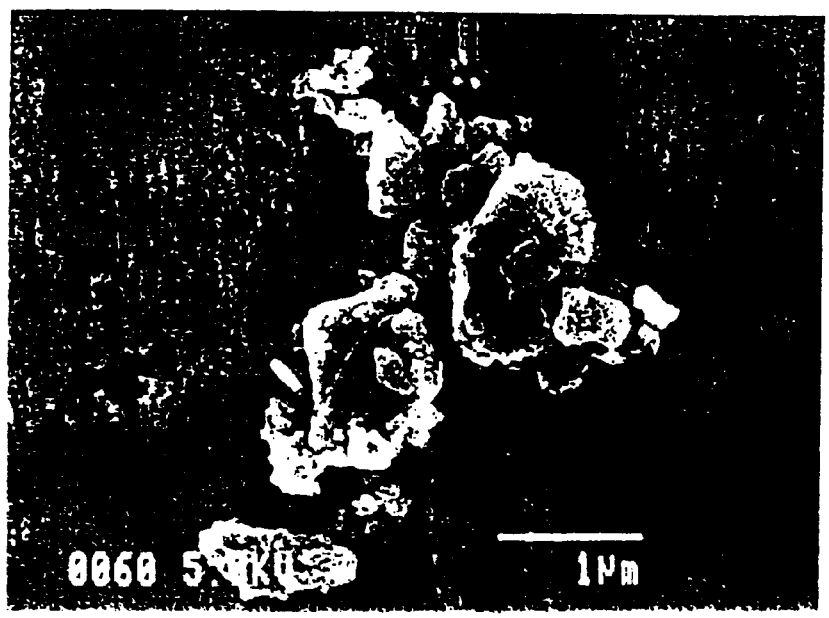
FIG. 6 is an SEM photograph showing the particle structure of aluminum hydroxide B.

FIG. 1 is an SEM photograph showing the particle structure of talc A. FIG. 2 is an SEM photograph showing the particle structure of talc B. FIG. 3 is an SEM photograph showing the particle structure of kaolin A. FIG. 4 is an SEM photograph showing the particle structure of kaolin B. FIG. 5 is an SEM photograph showing the particle structure of aluminum hydroxide A. FIG. 6 is an SEM photograph showing the particle structure of aluminum hydroxide B.

TABLE 1

| Material | Average particle size (μm) | BET specific surface area (m$^2$/g) | Chemical analysis value (%) | | | | | | |
|---|---|---|---|---|---|---|---|---|---|
| | | | Ig.loss | SiO$_2$ | Al$_2$O$_3$ | MgO | TiO$_2$ | Fe$_2$O$_3$ | CaO + Na$_2$O + K$_2$O |
| Talc A | 2.9 | 6.8 | 5.7 | 61.7 | 0.4 | 30.9 | — | 1.2 | 0.2 |
| Talc B | 3.1 | 12.5 | 5.4 | 61.2 | 0.6 | 30.9 | — | 0.9 | 0.2 |
| Talc C | 6.5 | 7.0 | 5.2 | 61.7 | 0.4 | 30.7 | — | 1.3 | 0.2 |
| Talc D | 1.3 | 17.8 | 5.3 | 61.6 | 0.7 | 31.6 | — | 0.7 | 0.1 |
| Talc E | 3.3 | 10.0 | 5.7 | 61.0 | 0.7 | 31.1 | — | 1.0 | 0.2 |
| Kaolin A | 0.4 | 12.8 | 13.9 | 45.6 | 38.7 | — | 0.8 | 0.3 | 0.2 |
| Kaolin B | 0.4 | 19.6 | 13.6 | 46.3 | 38.0 | 0.2 | 0.8 | 0.6 | 0.2 |
| Kaolin C | 0.5 | 14.0 | 14.0 | 45.5 | 39.0 | — | 1.0 | 0.4 | 0.1 |
| Kaolin D | 0.4 | 22.0 | 13.5 | 45.5 | 38.5 | — | 1.3 | 0.5 | 0.1 |
| Kaolin E | 0.5 | 16.2 | 13.8 | 45.7 | 38.9 | — | 0.7 | 0.3 | 0.1 |
| Calcined talc | 3.3 | 8.5 | 0.1 | 64.8 | 0.7 | 33.0 | — | 1.2 | 0.2 |
| Calcined kaolin | 1.4 | 9.3 | 0.1 | 52.5 | 44.6 | — | 1.5 | 0.3 | 0.2 |
| Alumina | 4.5 | 0.9 | 0.1 | — | 99.5 | — | — | — | 0.3 |
| Silica | 3.8 | 3.5 | — | 99.5 | 0.4 | — | — | — | — |
| Aluminum hydroxide A | 1.0 | 4.8 | 33.7 | — | 64.9 | — | — | — | 0.3 |
| Aluminum hydroxide B | 0.9 | 15.8 | 34.3 | — | 65.0 | — | — | — | 0.3 |
| Aluminum hydroxide C | 0.6 | 10.3 | 33.8 | — | 65.6 | — | — | — | 0.4 |
| Aluminum hydroxide D | 0.6 | 18.0 | 34.0 | — | 65.6 | — | — | — | 0.3 |
| Aluminum hydroxide E | 1.0 | 6.2 | 33.7 | — | 64.9 | — | — | — | 0.3 |

TABLE 2

| | Proportional ratio (% by weight) | | | | | | | Sum of talc + kaolin + aluminum hydroxide (% by weight) |
|---|---|---|---|---|---|---|---|---|
| | Talc (BET) | Kaolin (BET) | Aluminum hydroxide (BET) | Calcined talc | Calcined kaolin | Alumina | Silica | |
| Example 1 | 38.0 (12.5) | 20.0 (16.2) | 22.0 (15.8) | — | 15.0 | — | 5.0 | 80.0 |
| Example 2 | 38.0 (12.5) | 10.0 (16.2) | 22.0 (15.8) | — | 25.0 | — | 5.0 | 70.0 |
| Example 3 | 39.0 (12.5) | 10.0 (16.2) | 16.0 (15.8) | — | 25.0 | 5.0 | 5.0 | 65.0 |
| Example 4 | 39.0 (7.0) | 19.0 (16.2) | 12.0 (15.8) | — | 25.0 | 5.0 | — | 70.0 |
| Example 5 | 39.0 (10.0) | 19.0 (16.2) | 12.0 (15.8) | — | 25.0 | 5.0 | — | 70.0 |
| Example 6 | 39.0 (17.8) | 19.0 (16.2) | 12.0 (15.8) | — | 25.0 | 5.0 | — | 70.0 |

TABLE 2-continued

| | Proportional ratio (% by weight) | | | | | | | Sum of talc + kaolin + aluminum hydroxide (% by weight) |
|---|---|---|---|---|---|---|---|---|
| | Talc (BET) | Kaolin (BET) | Aluminum hydroxide (BET) | Calcined talc | Calcined kaolin | Alumina | Silica | |
| Example 7 | 39.0 (12.5) | 19.0 (14.0) | 12.0 (15.8) | — | 25.0 | 5.0 | — | 70.0 |
| Example 8 | 39.0 (12.5) | 19.0 (16.2) | 12.0 (15.8) | — | 25.0 | 5.0 | — | 70.0 |
| Example 9 | 39.0 (12.5) | 19.0 (19.6) | 12.0 (15.8) | — | 25.0 | 5.0 | — | 70.0 |
| Example 10 | 39.0 (12.5) | 19.0 (22.0) | 12.0 (15.8) | — | 25.0 | 5.0 | — | 70.0 |
| Example 11 | 38.0 (12.5) | 10.0 (19.6) | 22.0 (6.2) | — | 25.0 | — | 5.0 | 70.0 |
| Example 12 | 38.0 (12.5) | 10.0 (19.6) | 22.0 (10.3) | — | 25.0 | — | 5.0 | 70.0 |
| Example 13 | 38.0 (12.5) | 10.0 (19.6) | 22.0 (18.0) | — | 25.0 | — | 5.0 | 70.0 |
| Example 14 | 39.0 (12.5) | 22.0 (19.6) | 18.0 (15.8) | — | — | 11.0 | 10.0 | 79.0 |
| Example 15 | 39.0 (12.5) | 22.0 (16.2) | 18.0 (10.3) | — | — | 11.0 | 10.0 | 79.0 |
| Example 16 | 39.0 (12.5) | 19.0 (19.6) | 12.0 (15.8) | — | 25.0 | 5.0 | — | 70.0 |
| Example 17 | 39.0 (12.5) | 19.0 (19.6) | 12.0 (15.8) | — | 25.0 | 5.0 | — | 70.0 |

TABLE 3

| | Proportional ratio (% by weight) | | | | | | | Sum of talc + kaolin + aluminum hydroxide (% by weight) |
|---|---|---|---|---|---|---|---|---|
| | Talc (BET) | Kaolin (BET) | Aluminum hydroxide (BET) | Calcined talc | Calcined kaolin | Alumina | Silica | |
| Comparative Example 1 | 39.0 (12.5) | 10.0 (16.2) | 11.0 (15.8) | — | 25.0 | 10.0 | 5.0 | 60.0 |
| Comparative Example 2 | 39.0 (6.8) | 19.0 (16.2) | 12.0 (15.8) | — | 25.0 | 5.0 | — | 70.0 |
| Comparative Example 3 | 39.0 (12.5) | 19.0 (12.8) | 12.0 (15.8) | — | 25.0 | 5.0 | — | 70.0 |
| Comparative Example 4 | 38.0 (12.5) | 10.0 (19.6) | 22.0 (4.8) | — | 25.0 | — | 5.0 | 70.0 |
| Comparative Example 5 | 19.5 (12.5) | 21.0 (19.6) | 17.0 (15.8) | 19.5 | 19.0 | 4.0 | — | 57.5 |
| Comparative Example 6 | 39.0 (12.5) | — | 28.0 (15.8) | — | 20.0 | 3.0 | 10.0 | 67.0 |
| Comparative Example 7 | 39.0 (12.5) | 27.5 (19.6) | — | — | 18.5 | 15.0 | — | 66.5 |

With each clay mixture, a cylindrical honeycomb structure (honeycomb compact) with a 103 mm diameter and a 120 mm height, having a square cell shape with a 76 μm rib thickness and a 62 pieces/m² cell number was formed by a known extrusion method according to the firing conditions shown in Table 4 and 5 (Examples 1 to 17, Comparative Examples 1 to 7).

Figure 7:
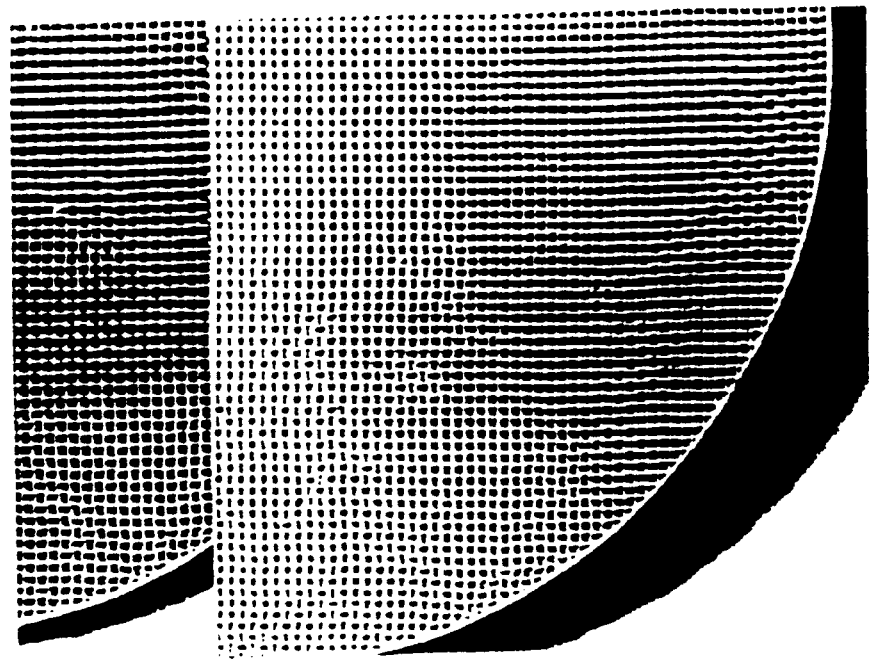
FIG. 7 is a photograph showing the texture of the ceramic material, which is the end face structure of the honeycomb structure of Example 12.
Figure 8:
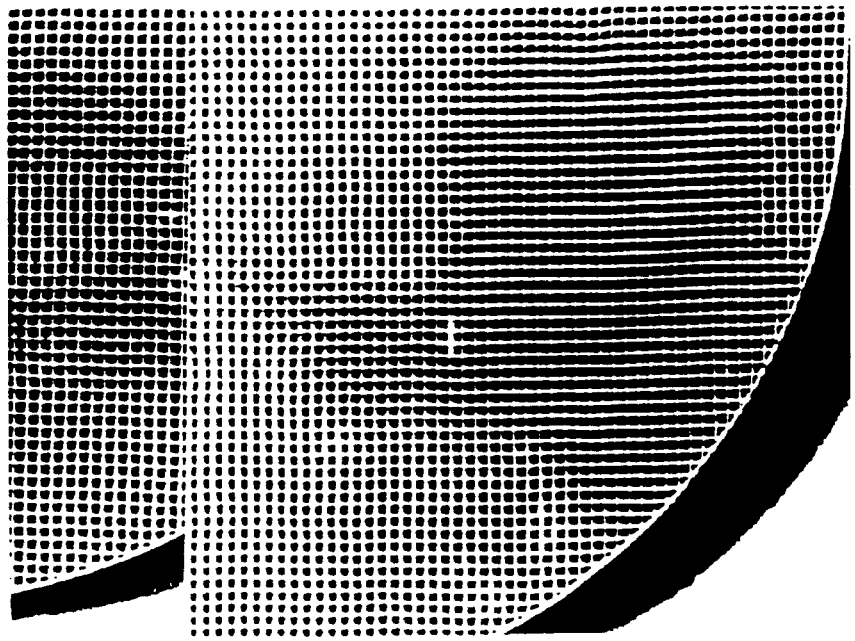
FIG. 8 is a photograph showing the texture of the ceramic material, which is the end face structure of the honeycomb structure of Comparative Example 1.

Measurement results of the coefficient of thermal expansion (the direction of flow passages of the honeycomb structure) at 40 to 800° C., the porosity, the thermal shock resistance and the isostatic strength of the obtained honeycomb sintered body (honeycomb structure) are shown in Tables 4 to 5. FIG. 7 is a photograph showing the texture of the ceramic material, which is the end face structure of the honeycomb structure of Example 12. FIG. 8 is a photograph showing the texture of the ceramic material, which is the end face structure of the honeycomb structure of Comparative Example 1.

TABLE 4

| | Firing conditions | | | Honeycomb sintered body characteristics | | | |
|---|---|---|---|---|---|---|---|
| | Temperature rise rate (° C/H) average value between value to 1350° C. | Maximum temperature (° C.) | Retention time (H) | Coefficient of thermal expansion (10⁻⁶/° C.) [40–800° C.] | Porosity (%) | Thermal impact resistance (° C.) | Isostatic strength (kg/cm²) |
| Example 1 | 60 | 1420 | 4 | 0.5 | 31 | 850 | 52 |
| Example 2 | 60 | 1420 | 4 | 0.5 | 33 | 850 | 43 |
| Example 3 | 60 | 1420 | 4 | 0.6 | 30 | 800 | 11 |
| Example 4 | 50 | 1420 | 4 | 0.5 | 31 | 850 | 12 |
| Example 5 | 50 | 1420 | 4 | 0.6 | 30 | 800 | 20 |
| Example 6 | 50 | 1420 | 4 | 0.7 | 30 | 750 | 48 |
| Example 7 | 60 | 1415 | 6 | 0.7 | 32 | 750 | 13 |
| Example 8 | 60 | 1415 | 6 | 0.6 | 30 | 800 | 57 |
| Example 9 | 60 | 1415 | 6 | 0.5 | 26 | 850 | 65 |
| Example 10 | 60 | 1415 | 6 | 0.4 | 24 | 900 | 35 |
| Example 11 | 60 | 1420 | 5 | 0.5 | 32 | 850 | 19 |
| Example 12 | 60 | 1420 | 5 | 0.5 | 30 | 850 | 46 |
| Example 13 | 60 | 1420 | 5 | 0.3 | 28 | 950 | 66 |
| Example 14 | 60 | 1425 | 4 | 0.5 | 36 | 850 | 71 |
| Example 15 | 80 | 1400 | 6 | 0.6 | 38 | 700 | 12 |
| Example 16 | 60 | 1390 | 4 | 0.9 | 32 | 650 | 37 |
| Example 17 | 80 | 1420 | 4 | 0.5 | 30 | 850 | 65 |

TABLE 5

| | Firing conditions | | | Honeycomb sintered body characteristics | | | |
|---|---|---|---|---|---|---|---|
| | Temperature rise rate (° C/H) average value between 1000 to 1350° C. | Maximum temperature (° C.) | Retention time (H) | Coefficient of thermal expansion (10⁻⁶/° C.) [40–800° C.] | Porosity (%) | Thermal impact resistance (° C.) | Isostatic strength (kg/cm²) |
| Comparative Example 1 | 60 | 1420 | 4 | 0.7 | 29 | 750 | 8 |
| Comparative Example 2 | 50 | 1420 | 4 | 0.5 | 31 | 800 | 8 |
| Comparative Example 3 | 60 | 1415 | 6 | 0.8 | 33 | 700 | 7 |
| Comparative Example 4 | 60 | 1420 | 5 | 0.6 | 34 | 800 | 8 |
| Comparative Example 5 | 60 | 1425 | 4 | 0.9 | 40 | 650 | *Not evaluated |
| Comparative Example 6 | 60 | 1425 | 4 | 0.7 | 35 | 750 | *Not evaluated |
| Comparative Example 7 | 60 | 1425 | 4 | 0.6 | 33 | 800 | 5 |

*Not evaluated: a continuous honeycomb structure external wall cannot be obtained (it is assumed to be 5 kg/cm² or less).

(Evaluation)

As apparent from the results of Examples 1 to 17 and Comparative Examples 1 to 7, the coefficient of thermal expansion and the porosity can be in a predetermined range, and can have excellent thermal shock resistance and isostatic strength when 65% or more cordierite raw material including talc, kaolin and aluminum hydroxide is contained in the material batch and the BET specific surface area of the talc, kaolin, and the aluminum hydroxide is in the specific range of the present invention compared with the case outside the range.

(Examples 18 to 21, Comparative Examples 8 to 9)

With clay mixture used in Example 12 and Comparative Example 1, a cylindrical honeycomb structure (honeycomb compact) with a 103 mm diameter and a 120 mm height, having the cell structure shown in Table 6 was formed by a known extrusion method according to the firing conditions shown in Table 6 (Examples 18 to 21, Comparative Examples 8 to 9).

Measurement results of the isostatic strength of the obtained honeycomb sintered body (honeycomb structure) are shown in Table 6.

From the results shown in Table 6, it was learned that the isostatic strength can differ drastically between the case with 65% by weight or more cordierite raw material including talc, kaolin and aluminum hydroxide in the material batch as in the present invention and the case with less than 65% by weight, even if the honeycomb structures with the same wall thickness and cell density are produced. That is, when the weight ratio is outside the range of the present invention (less than 65% by weight), the isostatic strength is less than 10 kg/cm², which is not-sufficient for the practical use.

TABLE 6

| | Wall thickness (μm) | Cell density (cell/cm²) | Isostatic strength (kg/cm²) | Cordierite material batch | Firing conditions |
|---|---|---|---|---|---|
| Example 18 | 102 | 62 | 79 | Example 12 | Temperature rise rate: 60° C./H* |
| Example 19 | 76 | 93 | 85 | | Maximum temperature: 1420° C. |
| Example 20 | 44 | 140 | 71 | | Retention time: 5 H |
| Example 21 | 40 | 186 | 88 | | |
| Comparative Example 8 | 102 | 62 | 9 | Comparative Example 1 | Temperature rise rate: 60° C./H* Maximum temperature: 1420° C. |
| Comparative Example 9 | 44 | 140 | 7 | | Retention time: 4 H |

As heretofore mentioned, according to a production method of a cordierite honeycomb structure of the present invention, a thinner wall and a higher cell density can be realized in the cordierite honeycomb structure as well as the formability (in particular, the lubricity and the shape stability) in extruding, the mechanical strength (hydrostatic pressure fracture strength) and the catalyst carrying characteristics can be improved.

What is claimed is:

1. A production method of a thin wall cordierite honeycomb structure having cordierite as the main component of the crystalline phase, which comprises:

adding a forming auxiliary agent to a cordierite material to obtain a mixture, kneading the mixture to obtain a material batch, forming the material batch by extrusion to form a honeycomb compact, drying the honeycomb compact to obtain a dried body, and firing the dried body, wherein 65% by weight or more flat plate-like cordierite raw material including crystal water made from talc, kaolin and aluminum hydroxide is contained in the cordierite material batch, with the BET specific surface areas for the cordierite raw materials being 7 to 18 $m^2/g$ of talc, 14 to 22 $m^2/g$ of kaolin and 6 to 18 $m^2/g$ of aluminum hydroxide.

2. The production method of a thin wall cordierite honeycomb structure according to claim 1, wherein the average wall thickness of the honeycomb structure is 110 μm or less.

3. The production method of a thin wall cordierite honeycomb structure according to claim 1, wherein the coefficient of thermal expansion in the direction of flow passages of the cordierite honeycomb structure at 40 to 800° C. is $0.8 \times 10^{-6}$/°C. or less, the porosity is 24 to 38%, and the isostatic strength is 10 kg/cm² or more.

4. The production method of a thin wall cordierite honeycomb structure according to claim 1, wherein the BET specific surface areas for the cordierite raw material are 10 to 18 $m^2/g$ of talc, 16 to 20 $m^2/g$ of kaolin and 10 to 18 $m^2/g$ of aluminum hydroxide.

5. The production method of a thin wall cordierite honeycomb structure according to claim 1, wherein 70% by weight or more flat plate-like cordierite raw material including crystal water made from talc, kaolin and aluminum hydroxide is contained in the cordierite material batch.

6. The production method of a thin wall cordierite honeycomb structure according to claim 3, wherein the porosity of the honeycomb structure is 30 to 38%.

* * * * *